US011688026B2

(12) United States Patent
Kawashima et al.

(10) Patent No.: US 11,688,026 B2
(45) Date of Patent: Jun. 27, 2023

(54) INFORMATION PROCESSING SYSTEM, INFORMATION PROCESSING METHOD, AND STORAGE MEDIUM

(71) Applicant: HONDA MOTOR CO., LTD., Tokyo (JP)

(72) Inventors: Daiki Kawashima, Tokyo (JP); Satoshi Haneda, Tokyo (JP); Noriyuki Ishida, Wako (JP); Sachiko Yamamoto, Wako (JP); Shinichiro Kobashi, Wako (JP); Shota Yamaguchi, Wako (JP); Marika Mochizuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/681,861

(22) Filed: Feb. 28, 2022

(65) Prior Publication Data

US 2022/0301084 A1  Sep. 22, 2022

(30) Foreign Application Priority Data

Mar. 16, 2021 (JP) .................................. 2021-042302

(51) Int. Cl.
*G06Q 30/02* (2023.01)
*G06Q 50/14* (2012.01)
*G06Q 30/0207* (2023.01)

(52) U.S. Cl.
CPC ......... *G06Q 50/14* (2013.01); *G06Q 30/0224* (2013.01); *G06Q 30/0225* (2013.01)

(58) Field of Classification Search
CPC ........... G06Q 30/0207–30/0277; G06Q 50/14; G06Q 30/0224; G06Q 30/0225
See application file for complete search history.

(56) References Cited

U.S. PATENT DOCUMENTS 6,965,868 B1 * 11/2005 Bednarek ........... G06Q 30/0201
  705/7.29
9,009,064 B2 * 4/2015 Karlin .................... G06Q 30/02
  705/14.69

(Continued)

FOREIGN PATENT DOCUMENTS

JP  2001-195491  7/2001
JP  2006-031087  2/2006

(Continued)

OTHER PUBLICATIONS

Japanese Office Action for Japanese Patent Application No. 2021-042302 dated Feb. 7, 2023.

*Primary Examiner* — Thuy N Nguyen
(74) *Attorney, Agent, or Firm* — Amin, Turocy & Watson, LLP

(57) ABSTRACT

An information processing device includes a storage medium that stores computer-readable instructions, and a processor connected to the storage medium, in which the processor executes the computer-readable instructions to acquire virtual experience information indicating that a user has been provided with a virtual travel service to experience a virtual travel, and purchase information indicating that the user has purchased a right to receive a real travel service to experience a real travel, in a case where the virtual experience information and the purchase information are acquired, generate grant information for granting an incentive for the user to purchase the right to a provider of the virtual travel service or a provider providing an apparatus used for the virtual travel service, and output the grant information.

8 Claims, 14 Drawing Sheets

(56) References Cited

U.S. PATENT DOCUMENTS

| | | | |
|---|---|---|---|
| 2009/0222358 A1* | 9/2009 | Bednarek | G06Q 30/0601 |
| | | | 705/26.1 |
| 2015/0127486 A1* | 5/2015 | Advani | G06Q 30/0241 |
| | | | 705/26.41 |
| 2018/0082477 A1 | 3/2018 | Wilde | |
| 2019/0139166 A1* | 5/2019 | Walker | G06Q 30/0207 |
| 2021/0162157 A1* | 6/2021 | Advani | G06Q 50/14 |

FOREIGN PATENT DOCUMENTS

| | | | |
|---|---|---|---|
| JP | 2018-049618 | | 3/2018 |
| JP | 2018-155887 | | 10/2018 |
| JP | 2020-201619 | | 12/2020 |
| KR | 2018-0044653 A | * | 10/2016 |
| KR | 2022-0082172 A | * | 12/2020 |
| KR | 10-2021-0004256 | | 1/2021 |
| WO | WO 2018/013497 A1 | * | 7/2017 |

* cited by examiner

FIG. 3

TRAVEL PRODUCT LIST 581

| PLAN NAME | DEPARTURE LOCATION | DESTINATION | MOVING OBJECT RENTAL | OPTIONAL TOUR | TOUR CONDUCTOR | ITINERARY | HOT-SELLER | POPULARITY | RECOMMENDATION | ADMINISTRATOR INVOLVED |
|---|---|---|---|---|---|---|---|---|---|---|
| PLAN AA | OO | OO | YES | NO | YES | DEFAULT | A | A | A | YES |
| PLAN BB | OO | OO | NO | YES | YES | DEFAULT | D | A | C | NO |
| PLAN CC | OO | OO | YES | YES | NO | FREE | C | B | C | YES |
| ... | | | | | | | | | | |

FIG. 4

BILLING INFORMATION 582

TRAVEL BUSINESS C

TRAVEL BUSINESS B

TRAVEL BUSINESS A

| DATE | PLAN | MOVING OBJECT RENTAL | OPTIONAL TOUR | TOUR CONDUCTOR | ITINERARY | HOT-SELLER | POPULARITY | RECOMMENDATION | ADMINISTRATOR INVOLVED | AMOUNT OF INCENTIVE MONEY |
|---|---|---|---|---|---|---|---|---|---|---|
| 0/0 | AA | YES | NO | YES | DEFAULT | A | A | A | YES | 00000 YEN |
| 0/0 | BB | NO | YES | YES | DEFAULT | D | A | C | NO | 00000 YEN |
| 0/0 | CC | YES | YES | NO | FREE | C | B | C | YES | 00000 YEN |
| ... | | | | | | | | | | |

INFORMATION PROCESSING SYSTEM, INFORMATION PROCESSING METHOD, AND STORAGE MEDIUM

CROSS-REFERENCE TO RELATED APPLICATION

This application is based upon and claims the benefit of priority from Japanese Patent Application No. 2021-042302, filed Mar. 16, 2021, the entire contents of which is incorporated herein by reference.

BACKGROUND

Field of the Invention

The present invention relates to an information processing device, an information processing method, and a storage medium.

Description of Related Art

In the related art, there is an experience device that allows virtual experience of a travel to be shared with a user who is considering details of a travel including a travel destination, a travel plan, or the like (refer to, for example, Japanese Unexamined Patent Application, First Publication No. 2018-155887).

SUMMARY

If the user makes a determination regarding the details of a travel, the degree of contribution of the experience device may not be reflected in the details of the travel determined as a result of a virtual experience using the experience device.

The present invention has been made in consideration of such circumstances, and one of the objects thereof is to provide an information processing device, an information processing method, and a storage medium capable of reflecting the degree of contribution of a virtual experience.

The information processing device, the information processing method, and the storage medium according to the present invention have the following configurations.

(1) According to a first aspect of the present invention, an information processing device is provided including a storage medium that stores computer-readable instructions; and a processor connected to the storage medium, in which the processor executes the computer-readable instructions to acquire virtual experience information indicating that a user has been provided with a virtual travel service to experience a virtual travel, and purchase information indicating that the user has purchased a right to receive a real travel service to experience a real travel, in a case where the virtual experience information and the purchase information are acquired, generate grant information for granting an incentive for the user to purchase the right to a provider of the virtual travel service or a provider providing an apparatus used for the virtual travel service, and output the grant information.

(2) According to a second aspect of the present invention, in the first aspect, the processor adjusts the incentive according to a value of the real travel service.

(3) According to a third aspect of the present invention, in the second aspect, the value includes at least one of a hot-seller, a popularity, or a recommendation.

(4) According to a fourth aspect of the present invention, in any one of the first to third aspects, the processor adjusts the incentive according to the type of the real travel service.

(5) According to a fifth aspect of the present invention, in the fourth aspect, the type of the real travel service includes at least one of a domestic travel, an overseas travel, the presence or absence of an optional tour, whether or not there is an accompanying tour conductor, or a travel itinerary.

(6) According to a sixth aspect of the present invention, in any one of the first to fifth aspects, the processor reduces the incentive in a case where the real travel service is a service that benefits the provider compared with a case where the real travel service is a service that does not benefit the provider.

(7) According to a seventh aspect of the present invention, in any one of the first to sixth aspects, the provider provides a predetermined service different from the virtual travel service as a part of the real travel, and the processor reduces the incentive in a case where the user has received the predetermined service compared with a case where the user has not received the service.

(8) According to an eighth aspect of the present invention, in any one of the first to seventh aspects, in a case where the user has virtually had a travel experience that the user who received the real travel service could not actually have as a part of the virtual travel in the virtual travel service, the processor generates the grant information for determining that an additional incentive for the travel experience that the user has virtually had is granted to the provider.

(9) According to a ninth aspect of the present invention, in the eighth aspect, the travel experience that the user can virtually have includes at least one of virtually touring some or all of determined tour routes in the real travel or virtually experiencing some or all of activities that the user could not experience on the routes.

(10) According to a tenth aspect of the present invention, there is provided an information processing method of causing a computer to acquire virtual experience information indicating that a user has been provided with a virtual travel service to experience a virtual travel, and purchase information indicating that the user has purchased a right to receive a real travel service to experience a real travel; in a case where the virtual experience information and the purchase information are acquired, generate grant information for granting an incentive for the user to purchase the right to a provider of the virtual travel service or a provider providing an apparatus used for the virtual travel service; and output the grant information.

(11) According to an eleventh aspect of the present invention, there is provided a non-transitory storage medium storing computer-readable instructions for causing a computer to execute acquiring virtual experience information indicating that a user has been provided with a virtual travel service to experience a virtual travel, and purchase information indicating that the user has purchased a right to receive a real travel service to experience a real travel; in a case where the virtual experience information and the purchase information are acquired, generating grant information for granting an incentive for the user to purchase the right to a provider of the virtual travel service or a provider providing an apparatus used for the virtual travel service; and outputting the grant information.

According to the above aspect, the degree of contribution of a virtual experience can be reflected.

BRIEF DESCRIPTION OF THE DRAWINGS

FIG. 3 is a diagram showing an example of details of a travel product list.

FIG. 4 is a diagram showing an example of details of billing information.

DESCRIPTION OF EMBODIMENTS

Hereinafter, embodiments of an information processing system including an information processing device, an information processing method, and a storage medium of the present invention will be described with reference to the drawings. The information processing system is, for example, a system for providing or executing a service for a travel business to sell travel products to a user for the purpose of travel and supporting the payment and receipt of money for travel between the travel business and the user. An administrator who owns the information processing device leases a virtual experience facility capable of providing a virtual travel experience to a travel business or a travel agency and receives incentives (earnings) from the travel business or the travel agency in a case where the travel agency has sold a travel product in which a user has experienced a virtual travel to the user.

First Embodiment

Figure 1:
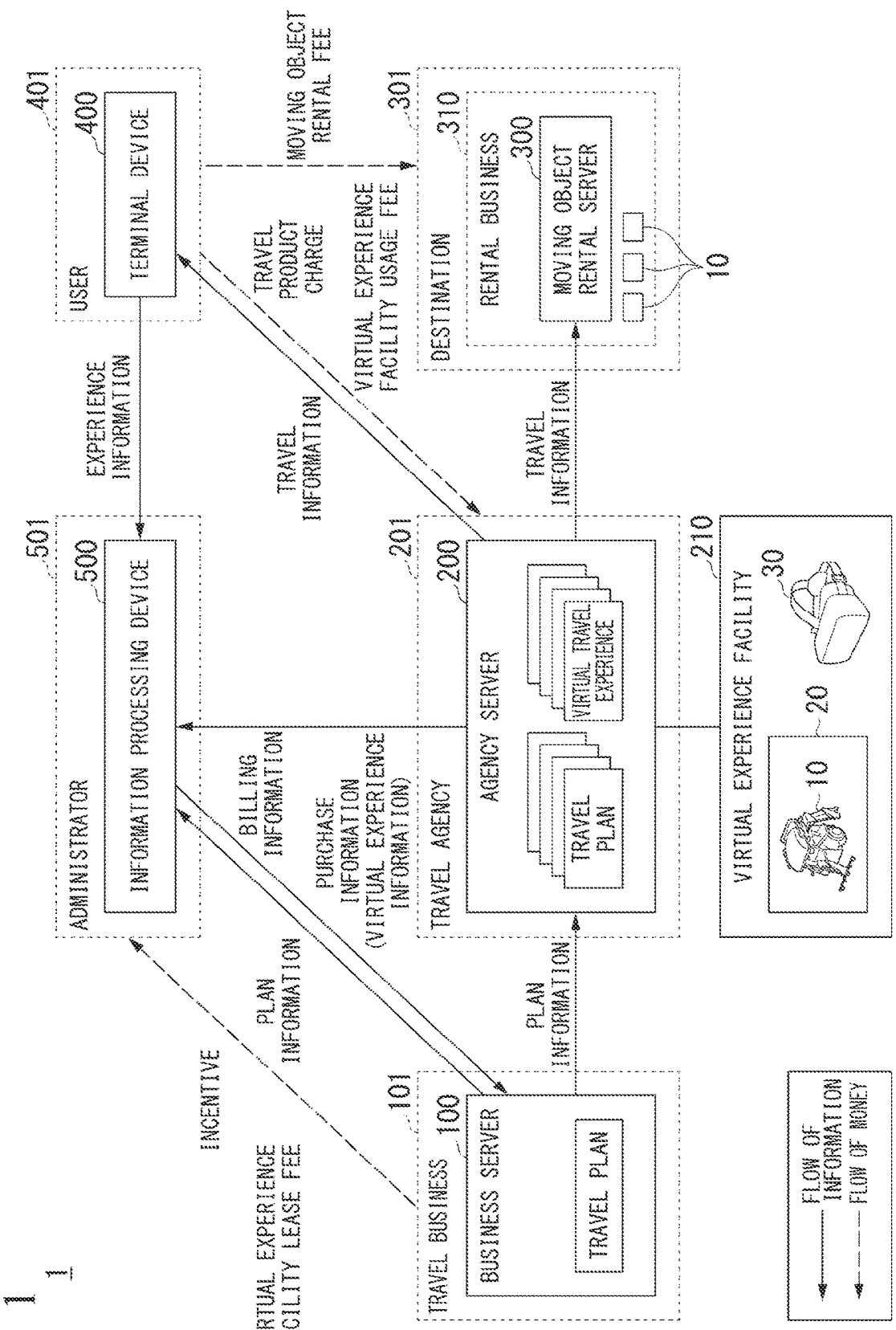
FIG. 1 is a diagram showing an example of a configuration of an information processing system of a first embodiment.

FIG. 1 is a diagram showing an example of a configuration of an information processing system 1 of a first embodiment. The information processing system 1 includes, for example, a business server 100, an agency server 200, a moving object rental server 300, a terminal device 400, and an information processing device 500. The business server 100, the agency server 200, the moving object rental server 300, the terminal device 400, and the information processing device 500 can communicate with each other via a network.

The business server 100 is owned by, for example, a travel business 101. The business server 100 is installed in a facility of the travel business 101, for example. The business server 100 transmits, for example, plan information of a travel product having a travel plan for various travels such as domestic travel and overseas travel planned by the travel business 101 to the agency server 200 and the information processing device 500. Travel products include, for example, products that include plans involving an administrator 501 and using facilities operated, managed, or leased by the administrator 501. The business server 100 transmits plan information to the agency server 200 and the information processing device 500 each time a travel product is created. The travel product is an example of the right of a user to receive a real travel service to experience a real travel.

The business server 100 receives billing information transmitted from the information processing device 500. The travel business 101 pays the administrator 501 an incentive for a user 401 who has experienced the virtual travel to purchase the travel product on the basis of the billing information transmitted to the business server 100.

The agency server 200 is owned by, for example, the travel agency 201. The agency server 200 is installed in a facility of the travel agency 201, for example. The agency server 200 receives the plan information transmitted by the business server 100. The agency server 200 stores the received plan information upon every receipt. A plurality of travel plans are stored in the agency server 200. The travel agency 201 designs a virtual travel experience based on a travel plan as a virtual travel experience of travel in a travel product. The agency server 200 stores the virtual travel experience together with the plan information.

The virtual travel experience is, for example, a virtual travel experience at a virtual experience facility 210. The virtual experience facility 210 is leased to the travel agency 101 by the administrator 501 and is a facility of which the travel business 101 outsources the operation to the travel agency. The virtual experience facility 210 will be described later. The virtual travel experience at the virtual experience facility 210 is an example of a virtual travel service. The administrator 501 is an example of a provider who provides an apparatus used for the virtual travel service. The travel agency 201 provides the virtual travel service to the user 401, and the virtual experience facility 210 is a facility leased to the travel agency 101 by the administrator 501. Therefore, the travel agency 201 is an example of a direct virtual travel service provider, and the administrator 501 is an example of an indirect virtual travel service provider.

The travel agency 201 stores the virtual travel experience designed on the basis of the travel plan for the travel product in correlation with the travel plan. The virtual travel experience may be designed by a person other than the travel agency 201, for example, the travel agency 101, the administrator 501, or another third party, and acquired by the agency server 200.

The travel agency 201 sells travel products to the user 401. The user 401 who has purchased the travel product can travel with the travel product. In a case where the travel agency 201 has sold the travel product to the user 401, the agency server 200 transmits travel information corresponding to the travel product to the terminal device 400. The travel information includes information regarding a charge, a departure location, a destination (travel destination), whether or not an optional tour is available, whether or not there is an accompanying tour conductor, and whether a travel itinerary is default (default plan) or free (free plan).

As a travel product, there is a product that includes a moving object rental service of renting a moving object 10 at a real travel destination. The travel information also includes information regarding the presence or absence of a moving object rental service. The moving object rental service is an example of a "predetermined service" different from the virtual travel service. The "predetermined service" is not limited to a moving object rental service and may be other services such as providing food and drink or a lodging house.

In a case where the travel product purchased by the user 401 includes the moving object rental service, the agency server 200 also transmits the travel information to the moving object rental server 300. The agency server 200 transmits purchase information regarding the travel product purchased by the user 401 to the information processing device 500. The purchase information is information indicating that a travel product has been purchased. The purchase information includes details included in the travel information and information regarding the presence or absence of a virtual travel experience of travel in the travel product. Information indicating that there is a virtual travel experience is an example of virtual experience information.

The travel agency 201 is provided with the virtual experience facility 210. The virtual experience facility 210 is, for example, a product leased to the travel business 101 by the administrator 501. The travel business 101 pays a virtual experience facility lease fee for the virtual experience facility 210 to the administrator 501 at regular intervals, for example, monthly.

A moving object 10 is installed in the virtual experience facility 210. A plurality of moving objects 10 similar to the moving object 10 installed in the virtual experience facility 201 are also deployed at a real travel destination 301. The user 401 can receive the rental service of the moving object 10 at the destination 301. By riding on the moving object 10 and traveling at the destination, the user 401 can experience the same real experience as the virtual experience at the virtual experience facility 201. The virtual experience facility 210 may be provided in the travel agency 201 or may be provided in a location away from the travel agency 201.

The moving object rental server 300 is owned by, for example, a rental business 310 at the destination 301. The moving object rental server 300 is installed at the destination 301, for example. The moving object rental server 300 manages a plurality of moving objects 10 deployed at the destination. The moving object rental server 300 receives travel information from the agency server 200. In a case where the moving object rental server 300 receives the travel information, the rental business 310 starts preparing when the user comes to request the rental of the moving object 10.

The terminal device 400 is owned by, for example, the user 401. The terminal device 400 is, for example, a portable terminal such as a smartphone or a tablet PC carried by the user 401. In the terminal device 400, an application program for using the service provided by the information processing system 1, a browser, or the like is started to support a service described below.

In the following description, it is assumed that the terminal device 400 is a tablet terminal and the application program (service application) for receiving the service has been started. The service application communicates with the agency server 200 and the information processing device 500 in response to an operation of the user 401, transmits information input by the user 401 and provides information based on received information. The terminal device 400 may be a terminal device other than a portable terminal, and may be, for example, a terminal device installed at the home of the user 401.

The terminal device 400 receives the travel information transmitted by the agency server 200. The terminal device 400 provides the user 401 with information such as a process and a charge of the travel product purchased by the user 401 on the basis of the received travel information. After the travel in the purchased travel product is finished, the terminal device 400 transmits experience information indicating details of a travel experience to the information processing device 500. The experience information includes information such as a destination, a location visited at the destination, an experience that the user has had, and whether or not the rental service of the moving object 10 has been provided.

In a case where the user 401 who owns the terminal device 400 has purchased the travel product from the travel agency 201, the user 401 pays a travel product charge to the travel agency 201. In a case where the user 401 has virtually experienced a virtual travel by using the virtual experience facility 210, the user pays a virtual experience facility usage fee to the travel agency 201.

The user 401 may rent the moving object 10 from the rental business 310 and ride the moving object 10 to enjoy the travel while traveling in the travel product. In this case, the user 401 can, for example, enjoy the virtual travel virtually experienced at the virtual experience facility 210 in a real travel. The user 401 who has rented the moving object 10 from the rental business 310 pays a moving object rental fee to the rental business.

Figure 2:
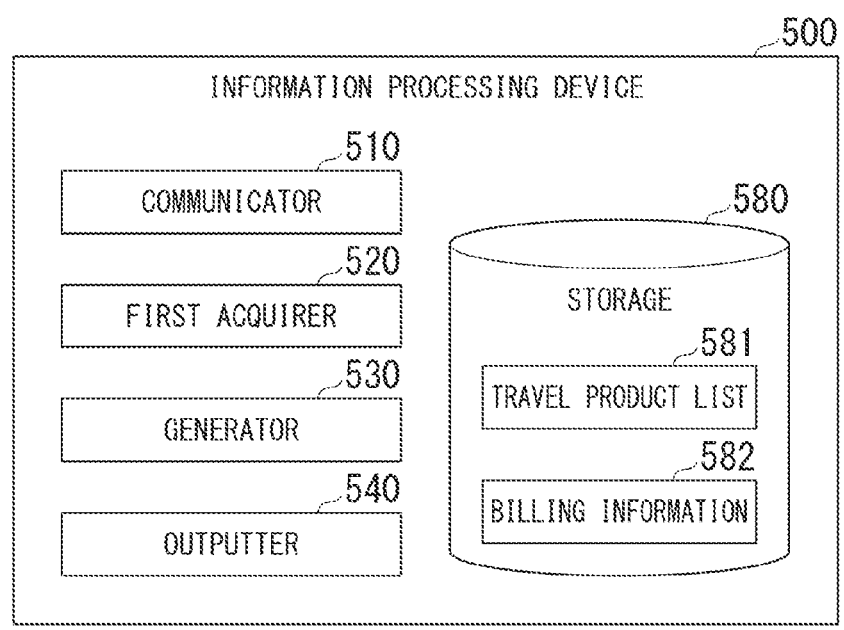
FIG. 2 is a diagram showing an example of a functional configuration of an information processing device.

The information processing device 500 is owned by, for example, the administrator 501 of the information processing system 1. The information processing device 500 is installed in a facility of the administrator 501, for example. FIG. 2 is a diagram showing an example of the functional configuration of the information processing device 500. The information processing device 500 includes, for example, a communicator 510, a first acquirer 520, a generator 530, an outputter 540, and a storage 580. The first acquirer 520, the generator 530, and the outputter 540 are realized by, for example, a processor such as a central processing unit (CPU) that is hardware executing a program (software). Some or all of the first acquirer 520, the generator 530, and the outputter 540 may be realized by hardware (a circuit portion; including circuitry) such as a large scale integration (LSI), an application specific integrated circuit (ASIC), a field-programmable gate array (FPGA), or a graphics processing unit (GPU), and may be realized by software and hardware in cooperation. The program may be stored in advance in a storage device (a storage device provided with a non-transitory storage medium) such as an HDD or a flash memory and may be stored in an attachable and detachable storage medium (non-transitory storage medium) such as a DVD or a CD-ROM and may be installed in the HDD or the flash memory when the storage medium is attached to a drive device. The storage 580 is realized by a hard disk drive (HDD), a DVD, a random access memory (RAM), a flash memory, or the like. A travel product list 581 and the like are stored in the storage 580.

The communicator 510 is, for example, a wireless communication module for connection to a network or directly communicating with another terminal device or the like. The communicator 510 performs wireless communication on the basis of Wi-Fi, Dedicated Short Range Communications (DSRC), Bluetooth (registered trademark), and other communication standards.

The first acquirer 520 acquires the purchase information transmitted by the agency server 200 and received by the communicator 510 and the experience information transmitted by the terminal device 400. The first acquirer 520 notifies the generator 530 of the acquired purchase information and experience information. The first acquirer 520 further acquires the plan information transmitted by the business server 100 and received by the communicator 510. The purchase information includes information regarding whether or not a virtual travel has been experienced (virtual experience information). The first acquirer 520 acquires the purchase information and thus the user 401 acquires the virtual experience information. In the first acquirer 520, the user 401 may acquire the virtual experience information on the basis of information other than the purchase information. For example, the virtual experience information may be added to the experience information transmitted by the terminal device, or the virtual experience information may be independently transmitted from the agency server 200 or the terminal device 400 and acquired by the first acquirer 520.

Here, the travel product list 581 will be described. FIG. 3 is a diagram showing an example of details of the travel product list 581. The travel product list 581 includes the name of a travel plan, a departure location, a destination, whether or not a rental service of the moving object 10 is provided, whether or not an optional tour is provided, whether or not there is an accompanying tour conductor, and whether or not a travel itinerary is default or free, and information regarding the involvement of the administrator 501 when making a travel plan. These types of information are included in the plan information transmitted by the business server 100. Whether or not a rental service of the moving object 10 is provided, whether or not an optional tour is provided, whether or not there is an accompanying tour conductor, and whether or not a travel itinerary is default or free are examples of types of travel products. The rental service of the moving object 10 is an example of a service provided at the destination in the travel product.

The travel product list 581 also includes information regarding a hot-seller, a popularity, and a recommendation. These types of information are generated by, for example, an analysis server (not shown) provided outside the information processing device 500. The hot-seller, the popularity, and the recommendation of travel products are examples of values of travel products. The hot-seller, the popularity, and the recommendation of travel products are ranked in descending order of "A", "B", "C", . . . .

The information processing device 500 acquires this information from the analysis server and adds the information to the travel product list 581. The first acquirer 520 updates the travel product list 581 by adding the travel plan indicated by the acquired plan information. The information processing device 500 may collect and analyze a large amount of travel information, experience information, and the like to generate and update such information.

The generator 530 determines whether or not the first acquirer 520 has acquired the virtual experience information and the purchase information on the basis of whether or not the purchase information reported by the first acquirer 520 includes the virtual experience information. The generator 530 determines whether or not the user 401 has received the rental service of the moving object 10 at a real travel destination on the basis of the experience information reported by the first acquirer 520.

The generator 530 generates information regarding an incentive selling the travel product in a case where it is determined that the first acquirer 520 has acquired the virtual experience information and the purchase information. In this case, the generator 530 calculates an amount of incentive money receiving from the travel agency 101 as an incentive for selling the travel product on the basis of the purchase information reported by the first acquirer 520 and the travel product list 581 stored in the storage 580. When calculating an amount of incentive money, the generator 530 adjusts the incentive according to a value or the type of travel product.

The generator 530 adjusts the incentive according to a value and the type of travel product. For example, the generator 530 adjusts the incentive to be higher in a case where a value of the travel product is high than in a case where the value thereof is low. The generator 530 adjusts the incentive on the basis of whether or not the travel product is a travel product in which the administrator 501 is involved. The travel product in which the administrator 501 is involved is, for example, a travel product with the intention of the administrator. Specifically, the travel plan for the travel product may include the use of a facility managed by the administrator 501 or a person related to the administrator 501. That is, the travel product in which the administrator 501 is involved is a travel product that benefits the administrator. In a case where the user 401 has been provided with the rental service of the moving object 10 at the destination in the travel product, the generator 503 reduces the incentive compared with a case where the user 401 has not been provided with the rental service of the moving object 10 at the destination in the travel product.

The generator 530 generates incentive grant information for the travel business 101 to grant an incentive to the administrator 501 on the basis of the calculated amount of incentive money. The generator 530 notifies the outputter 540 of the generated grant information as billing information requested by the administrator 501 to the travel business 101.

FIG. 4 is a diagram showing an example of details of billing information 582. The billing information includes the name of the travel agency 101, the date on which the travel product was sold, a travel plan for a travel product, each item that is a factor that increases or decreases an amount of incentive money, and an amount of incentive money. Each item that is a factor that increases or decreases an amount of incentive money is the type or a value of a travel product. The amount of incentive money is calculated by increasing or decreasing an amount of money depending on the presence or absence of each item that is a factor for increasing or decreasing the amount of incentive money on the basis of, for example, a standard amount of money determined for each travel plan.

The outputter 540 outputs the billing information reported by the generator 530 to the communicator 510. By transmitting the billing information output by the communicator 510 to the business server 100, the outputter 540 outputs the grant information (billing information) to the business server 100. The outputter 540 may output the billing information instead of or in addition to outputting the billing information to the business server 100 such that the amount of incentive money based on the billing information is displayed on a display device such as a display.

Next, the virtual experience facility 210 will be described. The virtual experience facility 210 includes the moving object 10, a running space 20 in which the moving object 10 runs, a head mounted display, for example, virtual reality (VR) goggles 30 worn by the user 401, and an integrated control device 30 that integrally controls the above constituents. The user 401 wears the VR goggles 30 and rides on the moving object 10 to move in the running space 20.

Figure 5:
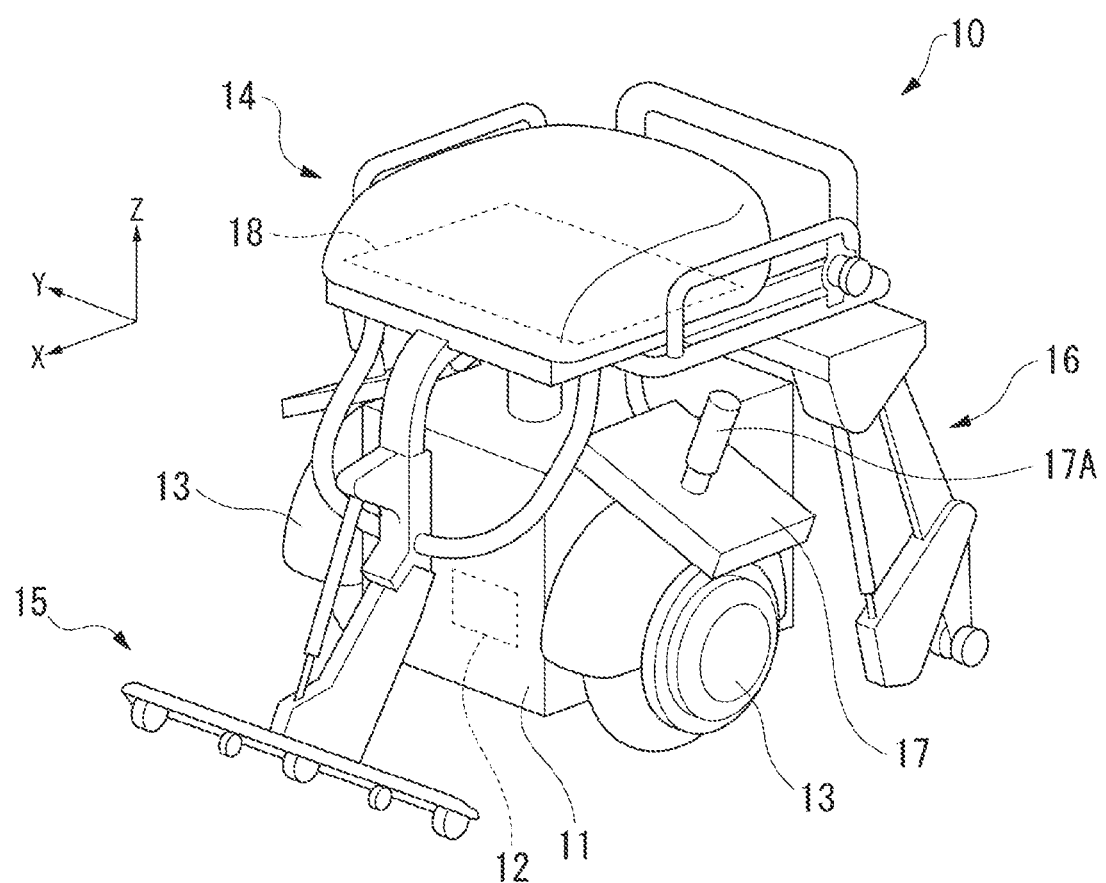
FIG. 5 is a perspective view showing a moving object.

FIG. 5 is a perspective view showing the moving object 10. Hereinafter, a front-rear direction of the moving object 10 may be referred to as an X direction, a lateral direction may be referred to as a Y direction, and a direction orthogonal to the X direction and the Y direction may be referred to as a Z direction. The moving object 10 is a moving object on which the user 401 can ride in the virtual experience facility 210. The moving object 10 runs in the running space 20 according to an operation of the user 401.

The moving object 10 includes, for example, a base 11. A control device 12 is housed inside the base 11. The control device 12 controls a running direction, a running speed, and the like of the moving object 10. In addition to the control device 12, a motor, a battery, and the like are housed inside the base 11. Wheels 13 are respectively assembled on the left and right sides of the base 11.

A seating portion 14 is provided on an upper part of the base 11. The seating portion 14 forms a cushion on which the user sits. An upper surface of the seating portion 14 is a seating surface that supports the user's buttocks from below. The seating portion 14 is supported by the base 11. The seating portion 14 is supported by the base 11, a first support portion 15 disposed in front of the base 11, and a second support portion 16 disposed behind the base 11. The first support portion 15 and the second support portion 16 support the seating portion 14 such that the seating portion is movable up and down.

An operation portion 17 is provided on the side of the seating portion 14. The operation portion 17 includes an operator 17A for the user to control an operation of the moving object 10. For example, the operator 17A is an operator for controlling an advancing direction, a running speed, a braking operation, and the like of the moving object 10. The operation portion 17 transmits an operation signal corresponding to an operation on the operator 17A to the control device 12. A user such as the user 401 can cause the moving object 10 to run by operating the operator 17A.

A load sensor 18 is provided inside the seating portion 14. The load sensor 18 detects a position where the user puts his/her weight on the seating portion 14. For example, when the user leans forward, a load of the user is detected in front of the seating portion 14. A load sensor 18 transmits the detected load to the control device 12. The control device 12 causes the moving object 10 to run with reference to the direction in which the load sensor 18 detects the load of the user. As described above, the user can cause the moving object 10 to run (move) by operating the operator 17A or by applying a load in a direction in which the user wants to move.

The moving object 10 of the embodiment is a so-called hands-free moving object 10 that can be operated by the weight movement of the user, and can be operated by operating the operation portion 17 by the user, but the operation portion 17 does not need to be provided. The moving object 10 may be a saddle-mounted moving object that the user straddles. The moving object 10 may be a moving object in which the user gets on a step while standing upright. The moving object 10 may move by walking with legs instead of the wheels.

The running space 20 is a space having a size that allows the moving object 10 to move, for example, a space having a bottom area of about several meters×several meters. The VR goggles 30 display a video that reminds the user 401 of a virtual space. The integrated control device 40 causes the VR goggles 30 to display a video corresponding to running of the moving object 10 in order to allow the user 401 to experience a virtual travel. The user 401 wearing the VR goggles 30 has a virtual travel experience by the video displayed on the VR goggles 30 and the movement of the moving object 10. Instead of the VR goggles 30, mixed reality (MR) goggles or augmented reality (AR) goggles may be used.

Next, a procedure of using the virtual experience facility 210 will be described. In the virtual experience facility 210, the user 401 wears the VR goggles 30 before entering the running space 20. A virtual door is displayed on the VR goggles 30, and the user 401 has a virtual travel experience of moving to a favorite destination through the virtual door.

Subsequently, a virtual tunnel is displayed on the VR goggles 30. The user 401 passes through the virtual tunnel and has a virtual experience of becoming smaller. The user 401 moves to the running space 20 through the virtual experience of passing through the virtual tunnel and gets on the moving object 10. The user 401 rides on the moving object 10 in the running space 20 and causes the moving object 10 to run while watching the video displayed on the VR goggles 30, and thus the user 401 experiences a virtual travel of traveling to a destination as a dwarf.

Figure 6:
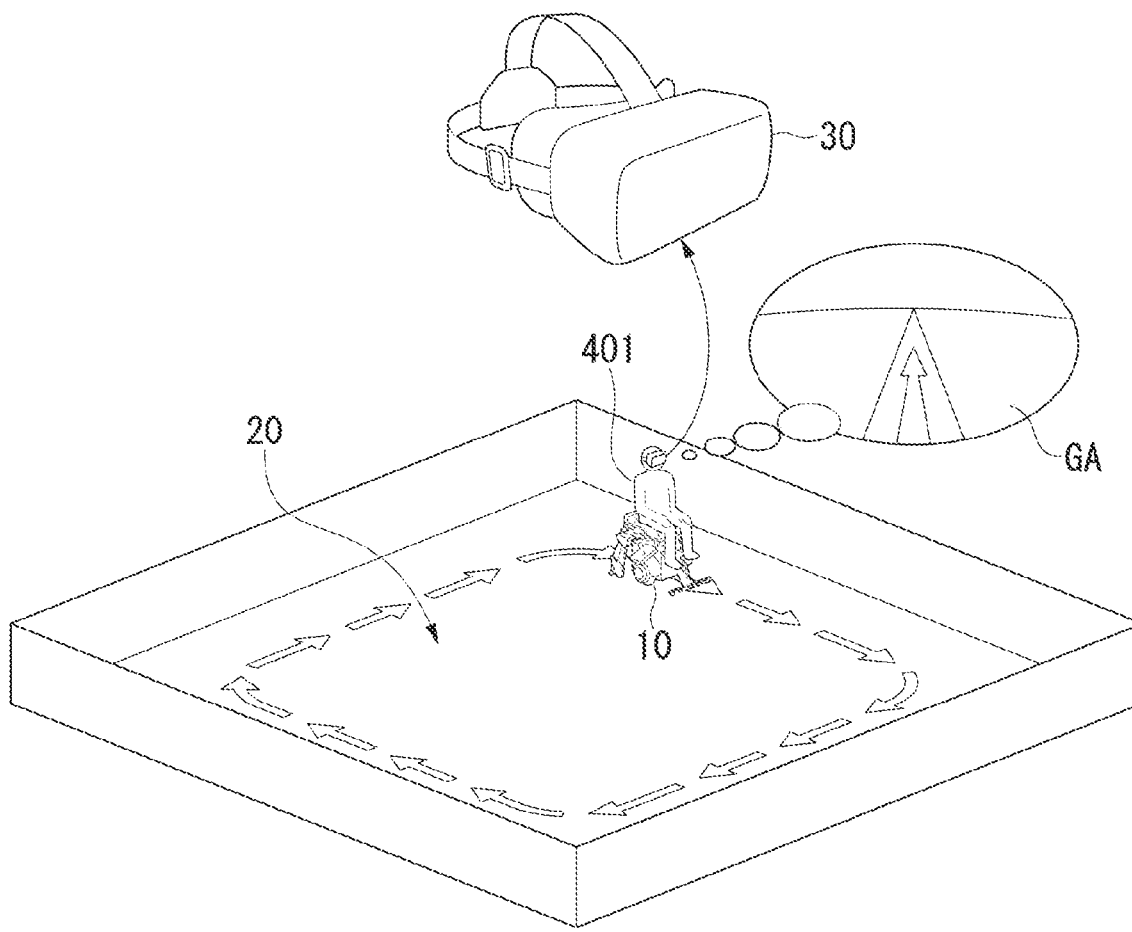
FIG. 6 is a bird's-eye view of a user who uses a virtual experience facility.

FIG. 6 is a bird's-eye view of the user 401 who uses the virtual experience facility 210. The user 401 operates the operator 17A of the moving object 10 while wearing the VR goggles 30 in the running space 20 or tilts his/her body on the seating portion 14 in a direction in which the user desires to move, so that the moving object 10 moves. At the virtual experience facility 210, a virtual travel can be experienced according to movement of the moving object 10.

For example, when the user 401 applies a load forward on the seating portion 14, the moving object 10 goes straight. In this case, a video GA in which the user 401 is heading forward is displayed on the VR goggles 30. The video GA shows the scenery of a destination of the virtual travel and a part of the user 401. The moving object 10 runs in the running space 20 due to an operation of the user 401, but, for example, in a case where the moving object 10 is about to collide with a wall portion in the running space 20, a trajectory of the moving object 10 is corrected by guiding the moving object 10 such that the correction is not noticed by the user 401.

Figure 7:
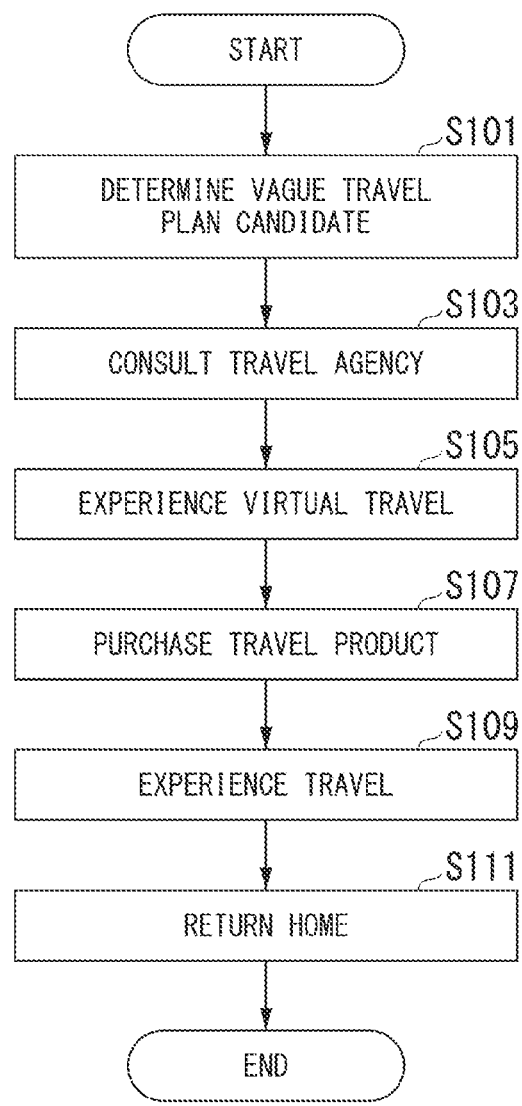
FIG. 7 is a flowchart showing an example of a flow from the user planning a travel to experiencing the travel.

Next, prior to description of a process in the information processing system 1, an example of the overall flow from the user 401 planning a travel to experiencing the travel by using the information processing system 1 will be described. FIG. 7 is a flowchart showing an example of a flow from the user 401 planning a travel to experiencing the travel. The user 401 who has planned a travel first determines a travel plan candidate including a vague destination (step S101).

The travel plan candidate may be a plan in which a specific place is defined or may be travel details in which a specific place is not defined. The user 401 is, for example, a person who wants to go on a trip, a person who cannot determine a destination, a person who wants to feel like traveling, and the travel plan candidate may be, for example, "I want to go to see nature". Candidates such as "I want to see 30 spectacular views of the world".

After determining the vague travel plan candidate, the user 401 consults the travel agency 201 (step S103). At the travel agency 201 that has been consulted, the user 401 receives a proposal for a virtual travel experience as a virtual travel service for experiencing a virtual travel according to the travel plan candidate. The user 401 experiences a virtual travel at the virtual experience facility 210 by referring to the proposal by the travel agency 201 (step S105).

In the virtual travel experience, the user 401 can imagine an experience at a destination with a feeling close to a real travel by virtually experiencing the travel at an actual destination. Since the user 401 can experience the virtual travel by riding on the moving object 10, the user 401 can experience the virtual travel with a small physical burden. Since the virtual travel can be virtually experienced (experienced) at a lower cost than that in the real travel, the user 401 can easily experience a large number of virtual travel experiences.

Subsequently, the user 401 determines a travel plan with reference to the virtual travel experience and purchases a travel product based on the determined travel plan from the travel agency (step S107). Thereafter, the user 401 experiences a travel according to the travel plan based on the purchased travel product (step S109). Thereafter, the user 401 finishes the travel and returns home (step S111). As described above, the travel of the user 401 is finished.

Figure 8:
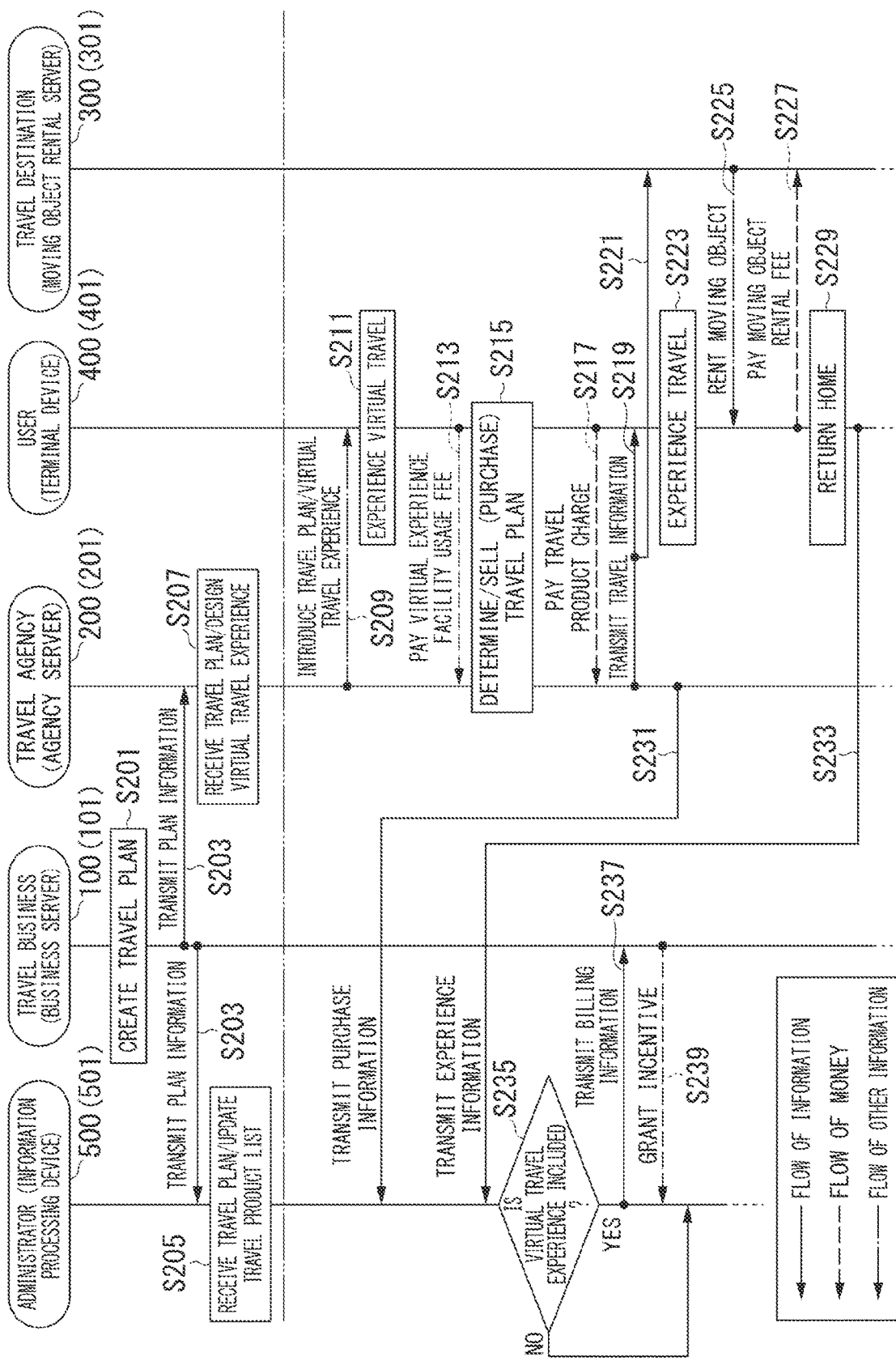
FIG. 8 is a diagram showing an example of a flow of information and the like between respective constituents of the information processing system.

A description will be made of an operation of each constituent of the information processing system 1 in the process of really traveling after the user 401 determines the travel plan in the flow described hitherto. FIG. 8 is a diagram showing an example of a flow of information and the like between the respective constituents of the information processing system 1. As a stage before the user 401 plans a travel, the travel business 101 makes and creates various travel plans (step S201). When the travel agency 101 creates a travel plan, the business server 100 transmits plan information to the agency server 200 and the information processing device 500 (step S203).

The information processing device 500 receives the transmitted plan information and updates the travel product list 581 on the basis of the received plan information (step S205). The agency server 200 receives the transmitted plan information and designs a virtual travel experience based on the received travel plan (step S207). In the stage before the user 401 plans a travel, the processes up to this step are repeatedly executed, and travel products for each of a plurality of travel plans are sold.

The user 401 who plans a travel determines a vague travel plan and consults the travel agency 201. The travel agency 201 introduces a travel plan according to the wishes of the user 401 (step S209). When introducing the travel plan, the travel agency 201 introduces a virtual travel experience at the virtual experience facility 210 based on the travel plan to the user 401 together with the travel plan (step S209). The user 401 experiences a virtual travel in response to the introduction of the travel agency 201 (step S211). The user 401 who experiences the virtual travel pays a virtual experience facility usage fee to the travel agency 201 (step S213). The virtual experience facility usage fee may be paid together with a travel product charge.

The user 401 determines a travel plan in consultation with the travel agency 201 with reference to the virtual travel experience. When the user 401 determines the travel plan, the user 401 purchases a travel product sold by the travel agency 201 (step S215). Subsequently, the user 401 pays a travel product charge to the travel agency 201 (step S217).

When the travel product is bought and sold, the agency server 200 transmits travel information based on the travel plan to the terminal device 400 (step S219). In a case where the determined travel plan includes a moving object rental service, the agency server 200 also transmits the travel information to the moving object rental server 300 (step S221).

Thereafter, on the day of the travel, the user 401 experiences a real travel (step S223). When the travel plan for the real travel experienced by the user 401 includes the moving object rental service, the rental business 310 rents the moving object 10 to the user 401 at the destination 301 (step S225). The user 401 pays a moving object rental fee to the rental business 310 according to the rental of the moving object 10 (step S227). Thereafter, the real travel is finished, and the user 401 returns home (step S229).

Before the user 401 returns home from the real travel, the agency server 200 transmits the purchase information of the travel product purchased by the user 401 to the information processing device 500 (step S231). On the other hand, when the user 401 returns home from the real travel, the terminal device 400 transmits experience information to the information processing device 500 (step S233).

The information processing device 500 that has received the purchase information and the experience information determines whether or not there is a virtual travel experience at the destination in the travel product included in the purchase information (step S235). As a result, in a case where it is determined that there is a virtual travel experience at the destination in the travel product, the information processing device 500 calculates an amount of incentive money on the basis of the received purchase information and experience information and transmits billing information for requesting an incentive to the business server 100 (step S237). A procedure of calculating an amount of incentive money will be described later.

The travel business 101 of which billing information has been transmitted to the business server 100 grants an incentive to the administrator 501 by paying an amount of money according to the billing information (step S239). As described above, a series of processes is finished. In a case where the information processing device 500 determines in step S235 that there is no virtual travel experience at the destination in the travel product, the series of processes is finished without further processes.

Figure 9:
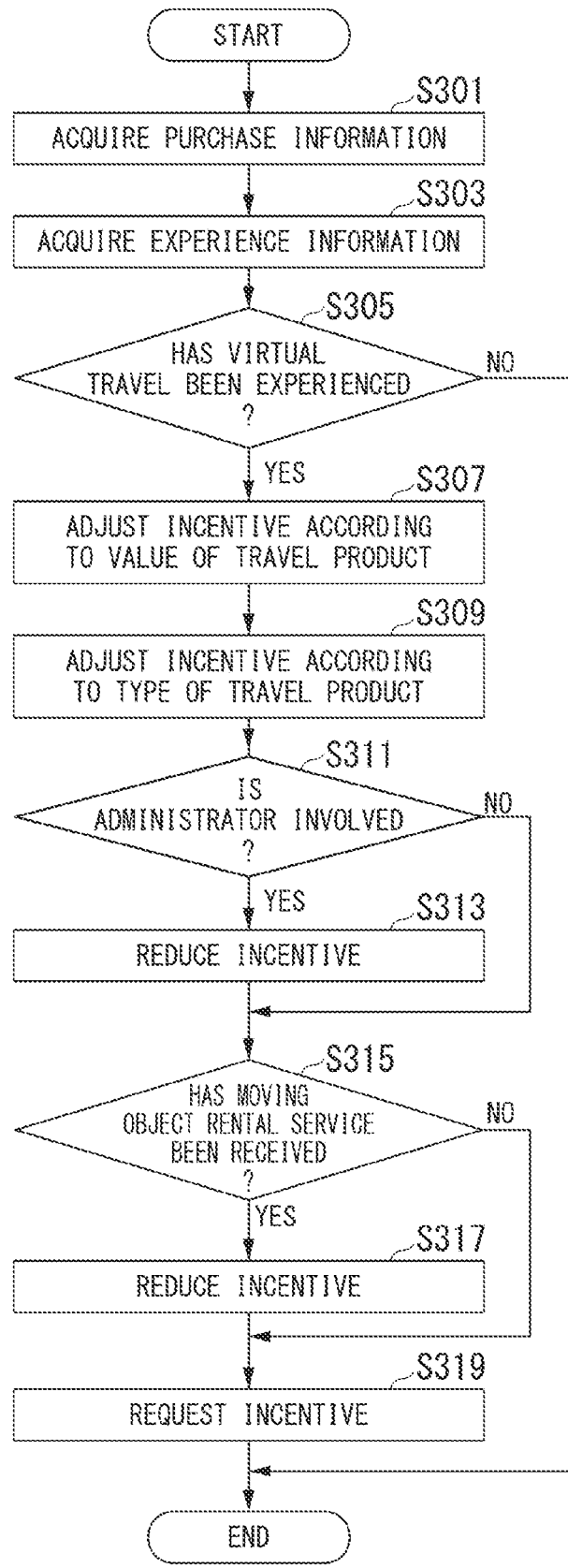
FIG. 9 is a flowchart showing an example of a process of the information processing device.

Subsequently, a process in the information processing device 500 will be described. The process in the information processing device 500 includes a procedure of calculating an amount of incentive money. FIG. 9 is a flowchart showing an example of a process in the information processing device 500. First, the information processing device 500 receives purchase information transmitted by the agency server 200 in the communicator 510 and acquires the purchase information in the first acquirer 520 (step S301). Subsequently, the information processing device 500 receives experience information transmitted by the terminal device 400 by the communicator 510 and acquires the experience information in the first acquirer 520 (step S303).

Subsequently, the generator 530 determines whether or not the user 401 has had a virtual travel experience in a travel product purchased by the user 401 on the basis of whether or not the purchase information acquired by the first acquirer 520 includes virtual experience information (step S305). In a case where it is determined that the user 401 has not had the virtual travel experience in the travel product, the information processing device 500 finishes the process shown in FIG. 9. In a case where it is determined that the user 401 has had the virtual travel experience in the travel product, the generator 530 adjusts an amount of incentive money on the basis of a value of the travel product included in the purchase information (step S307). In this case, the generator 530 adjusts an incentive to be high as the travel product is considered to be of high value to the user 401. As the incentive adjustment, for example, a few percent may be added (discounted) to an amount of money before adjustment, or a certain amount of money may be added (subtracted).

The generator 530 adjusts an incentive according to the degree or popularity of the travel product as a hot-seller. Here, travel products with a high degree or popularity of a hot-seller are sold even with a small sales effort, but in a case where travel products with a low degree or popularity of a hot-seller are sold, the virtual experience travel is considered to be valuable (the degree of contribution of the virtual travel experience to the sale of travel products is high). Thus, for example, the generator 530 adjusts an incentive to be higher in a case where the degree of a hot-seller of the travel product is low than in a case where it is high. Similarly, the generator 530 adjusts an incentive to be higher in a case where the popularity of the travel product is low than in a case where it is high and adjusts the incentive to be lower in a case where the popularity of the travel product is high than in a case where it is low. In this case, the generator 530 adjusts the incentive to become higher as the profit of the travel business 101 from the sale of the travel product is considered to become larger.

Subsequently, the generator 530 adjusts the incentive on the basis of the type of travel product included in the purchase information (step S309). For example, the generator 530 adjusts the incentive to be higher in a case where the travel product includes an optional tour than in a case where the travel product does not include the optional tour. Similarly, the generator 530 adjusts the incentive to be higher in a case where the travel product is accompanied by a tour conductor than in a case where the travel product is not accompanied by a tour conductor and adjusts the incentive to be higher in a case where the travel itinerary is default than in a case where it is free.

Subsequently, the generator 530 determines whether or not the travel product included in the purchase information is a travel product in which the administrator 501 is involved (step S311). In a case where it is determined that the travel product is a travel product in which the administrator 501 is involved, the generator 530 reduces an amount of incentive money (step S313) to reduce the incentive. In a case where it is determined that the travel product is not a travel product in which the administrator 501 is involved, the generator 530 skips the process in step S313 and causes the process to proceed to step S315.

Subsequently, the generator 530 determines whether or not the user 401 has received a moving object rental service from the rental business 310 at the destination 301 on the basis of the experience information transmitted by the terminal device 400 (step S315). In a case where it is determined that the user 401 has received the moving object rental service, the generator 530 reduces an amount of incentive money (step S317) to reduce the incentive. In a case where it is determined that the user 401 has not received the moving object rental service, the generator 530 skips the process in step S317 and causes the process to proceed to step S319. As described above, the generator 530 calculates an amount of incentive money.

The generator 530 generates billing information on the basis of the calculated amount of incentive money. Subsequently, the generator 530 notifies the outputter 540 of the generated billing information. The outputter 540 outputs the billing information generated by the generator 530 to the business server 100 via the communicator 510. As described above, the information processing device 500 finishes the process shown in FIG. 9.

In a case where the generator 530 determines that the first acquirer has acquired the virtual experience information and the purchase information and the user 401 has had the virtual travel experience in the travel product, the information processing device 500 of the first embodiment generates the billing information for the sale of the travel product and transmits the billing information to the business server 100 of the travel business 101. The travel business 101 grants an incentive to the administrator 501 by paying an amount of money based on the billing information. Thus, the information processing device 500 can determine whether or not the travel product purchased by the user 401 is a product selected as a result of using the virtual experience facility 210, and thus it is possible to reflect the degree of contribution of the virtual experience in a case where the user has had the virtual experience and has determined details of the travel.

The information processing device 500 adjusts an incentive according to a value or the type of a travel product. Thus, an incentive between the administrator 501 and the travel business 101 can be appropriately adjusted to be high or low. The information processing device 500 reduces an incentive in a case where the travel product is a product in which the administrator 501 is involved. The travel product in which the administrator 501 is involved is often a product that contributes to profits of the administrator 501. Thus, by reducing the incentive, it is possible to appropriately adjust profits between the administrator 501 and the travel business 101.

Second Embodiment

Next, a second embodiment will be described. An information processing system 1 of the second embodiment is different from that of the first embodiment mainly in processes after the user 401 finishes the travel. Hereinafter, an information processing device, an information processing method, and a storage medium of the second embodiment will be described focusing on the differences from the first embodiment.

Figure 10:
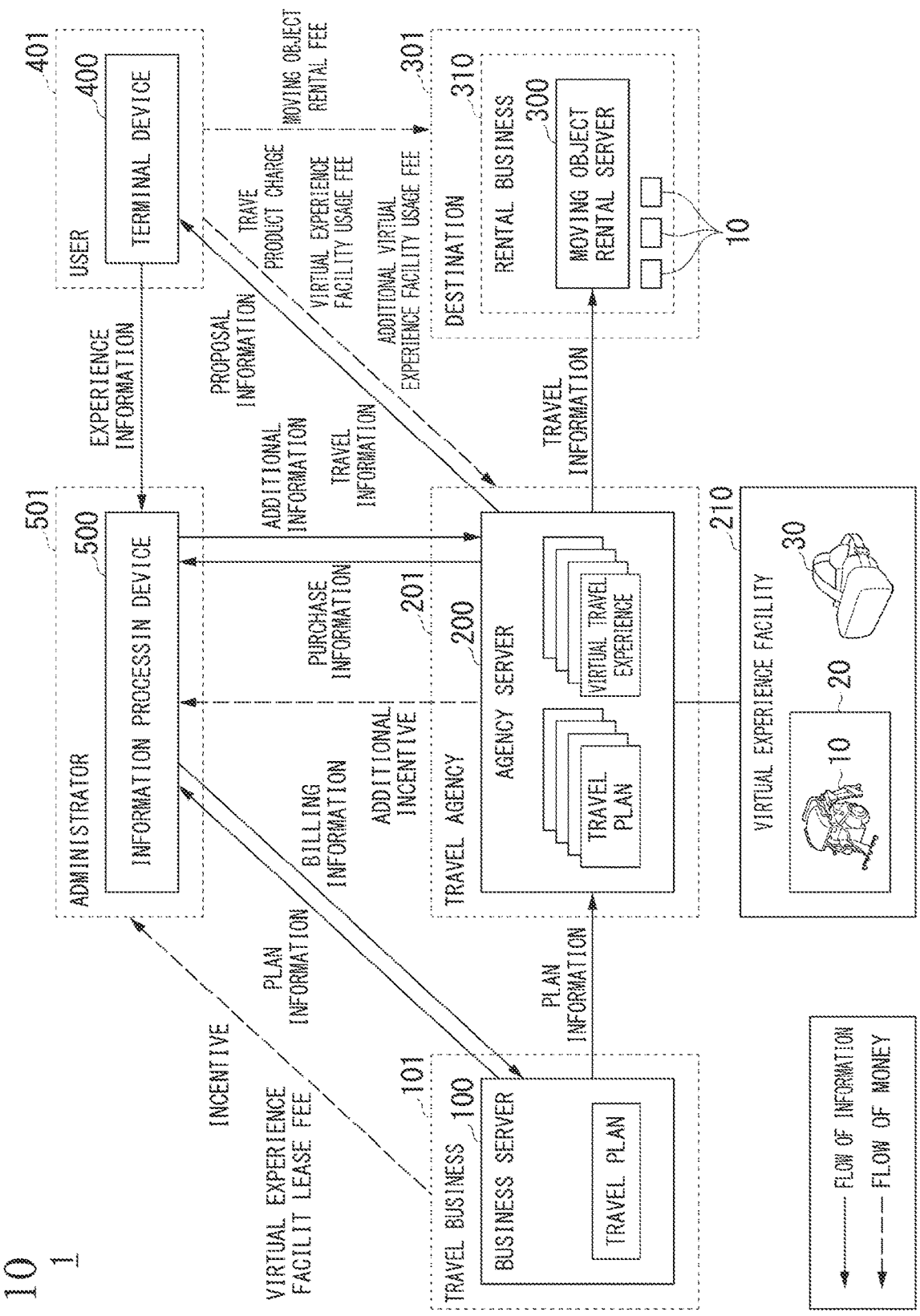
FIG. 10 is a diagram showing an example of a configuration of an information processing system of a second embodiment.

FIG. 10 is a diagram showing an example of a configuration of the information processing system 1 of the second embodiment. In the information processing system 1 of the second embodiment, a difference from the first embodiment is that the information processing device 500 acquires an additional virtual experience plan for causing a user to have an additional virtual travel experience (hereinafter, additional virtual experience) on the basis of experience information or the like transmitted by the terminal device 400, generates additional information on the basis of the additional virtual experience, and transmits the additional information to the agency server 200.

The additional virtual experience is, for example, an experience of an unexperienced virtual travel based on inexperience information of a travel experience that the user 401 could not have at a destination of a real travel (hereinafter, a target travel) that is a target of experience information. The additional virtual experience is, for example, an experience of an unexperienced virtual travel (hereinafter, a first virtual experience) in which the user visits a route that the user could not visit at the destination of the target travel. Alternatively, the additional virtual experience is, for example, an experience of an unexperienced virtual travel (hereinafter, a second virtual experience) of which the user 401 could not have an experience in the route that the user 401 visited at the destination of the target travel.

The first virtual experience is, for example, a virtual experience in which the user 401 visits a route that the user 401 could not visit in a case where a plurality of routes along which the user 401 visits a sightseeing target are set at the destination of the target travel. The second virtual experience is, for example, a virtual experience for a historical experience that the user 401 could not have in a target travel in which the user 401 has various historical experiences.

The agency server 200 generates proposal information on the basis of the additional information transmitted by the information processing device 500 and transmits the proposal information to the terminal device 400, and thus the travel agency 201 proposes additional virtual experience plan to the user 401. In a case where the user 401 responds to the proposal of the agency server 200, the travel agency 201 causes the user 401 to have an additional virtual experience by using the virtual experience facility 210. The user 401 pays a fee for the additional virtual experience to the travel agency 201 as an additional virtual experience facility usage fee. The travel agency 201 that has received the additional virtual experience facility usage fee grants an additional incentive to the administrator 501. The additional incentive may be granted by the travel business 101 instead of the travel agency 201.

Figure 11:
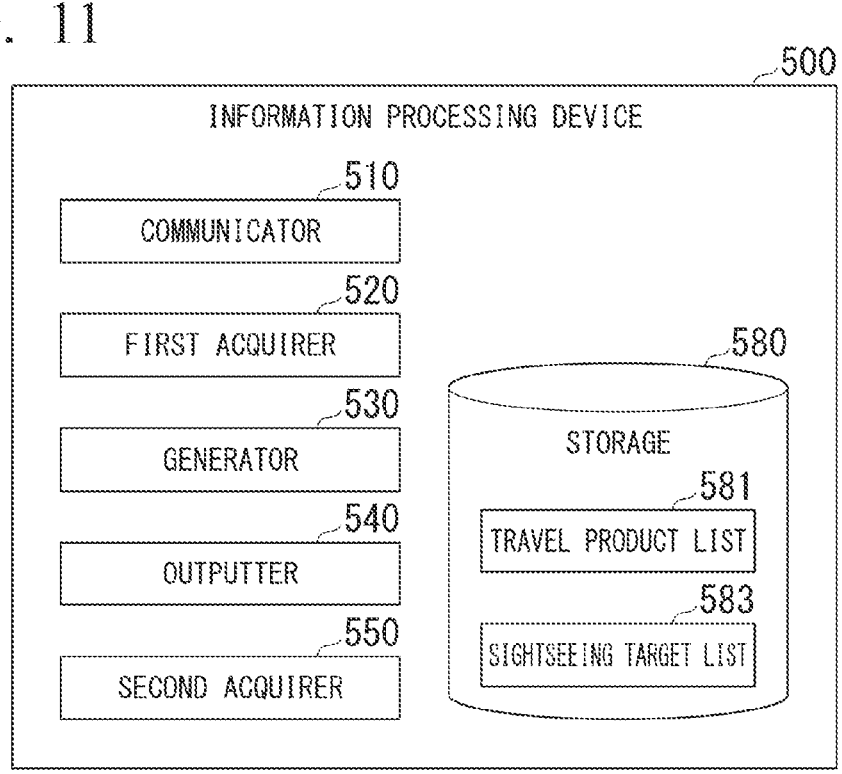
FIG. 11 is a diagram showing an example of a functional configuration of an information processing device.

FIG. 11 is a diagram showing an example of a functional configuration of the information processing device 500. The information processing device 500 of the second embodiment includes a communicator 510, a first acquirer 520, a generator 530, an outputter 540, and a storage 580, which are the same as those of the first embodiment. The information processing device 500 of the second embodiment includes a second acquirer 550 in addition to these constituents. The second acquirer 550 is realized, for example, by a processor such as a CPU that is hardware executing a program together with the first acquirer 520, the generator 530, and the outputter 540. The first acquirer 520, the generator 530, the outputter 540, and the second acquirer 550 may also be realized by the LSI or the like described in the first embodiment.

Figure 12:
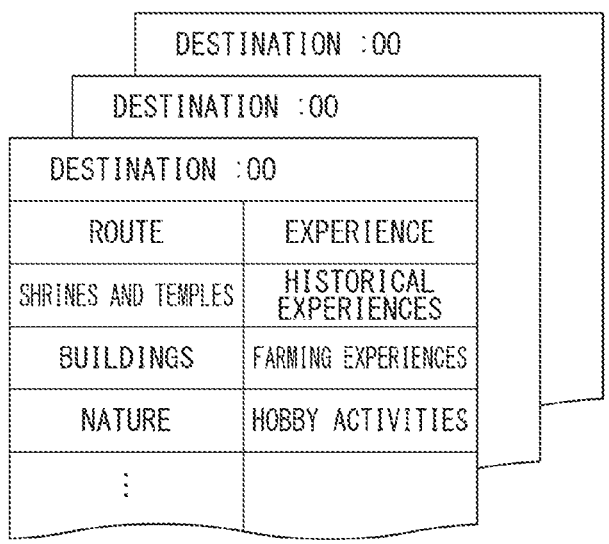
FIG. 12 is a diagram showing an example of a sightseeing target list.

The storage 580 stores a sightseeing target list 583 in addition to the travel product list 581. FIG. 12 is a diagram showing an example of the sightseeing target list 583. The sightseeing target list 583 is created for each destination. The sightseeing target list 583 includes a plurality of types of routes and experiences on visited routes at a destination. Sightseeing targets include, for example, information such as shrines and temples routes for visiting shrines and temples, building routes for visiting famous buildings such as high-rise buildings, and nature routes for visiting nature such as famous parks and plateaus. Experiences on visited routes include, for example, historical experiences such as ninja experiences, farming experiences such as potato digging and rice harvesting, and hobby activities (activities) such as fishing and watching sports.

The first acquirer 520 specifies a destination included in the experience information transmitted by the terminal device 400 and refers to the sightseeing target list 583 of the specified destination. The first acquirer 520 compares a place that the user 401 visited at the destination and an experienced action with the items included in the sightseeing target list 583 and specifies a sightseeing target of a route that the user 401 could not visit at the destination and an experience that the user could not have on the visited route. The first acquirer 520 generates inexperience information on the basis of the comparison result. The first acquirer 520 acquires the inexperience information by generating the inexperience information. The first acquirer 520 may acquire the inexperience information generated by a device or the like other than the first acquirer 520. The first acquirer 520 notifies the second acquirer 550 of the acquired inexperience information.

The second acquirer 550 creates an additional virtual experience plan for causing the user 401 to have the first virtual experience and the second virtual experience reported by the first acquirer 520 and generates additional information based on the additional virtual experience. The second acquirer 550 acquires the additional virtual experience plan by creating the additional virtual experience plan by itself. The additional information includes additional billing information indicating an amount of additional incentive money in a case where the user 401 has experienced the additional virtual experience plan.

The second acquirer 550 may acquire an additional virtual experience plan generated by the travel agency 201, another device, or the like. The second acquirer 550 may be provided in the agency server 200, and the agency server 200 may create an additional virtual experience plan. The outputter 540 transmits the additional information acquired by the second acquirer 550 to the agency server 200 via the communicator 510.

Figure 13:
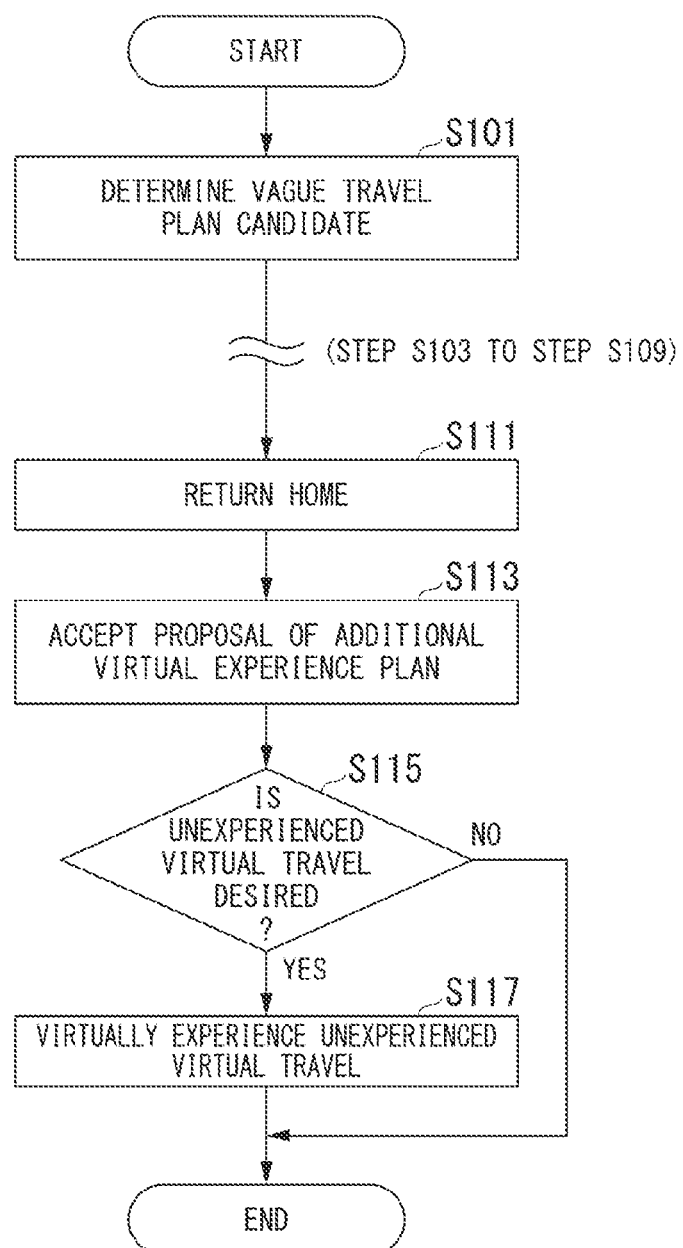
FIG. 13 is a flowchart showing a part of an example of a flow from a user planning a travel to experiencing the travel.

Next, an example of a flow from the user 401 planning a travel to experiencing the travel in the second embodiment will be described. FIG. 13 is a flowchart showing a part of an example of the flow from the user 401 planning the travel to experiencing the travel. In the second embodiment, when the user 401 plans a travel, the steps from step S101 to step S111 shown in FIG. 7 are executed as in the first embodiment.

Subsequently, the user 401 accepts the proposal of the additional virtual experience plan by the terminal device 400 receiving the proposal information transmitted by the agency server 200 (step S113). The user 401 examines the accepted additional virtual experience plan and determines whether or not the user desires an experience of the unexperienced virtual travel (step S115).

In a case where the user 401 desires an experience of the unexperienced virtual travel, the user has an experience of the unexperienced virtual travel based on the additional virtual experience plan (step S117). Thereafter, the user 401 finishes the post-travel action. In a case where the user does not desire the unexperienced virtual travel, the user 401 finishes the post-travel action without further processes.

Figure 14:
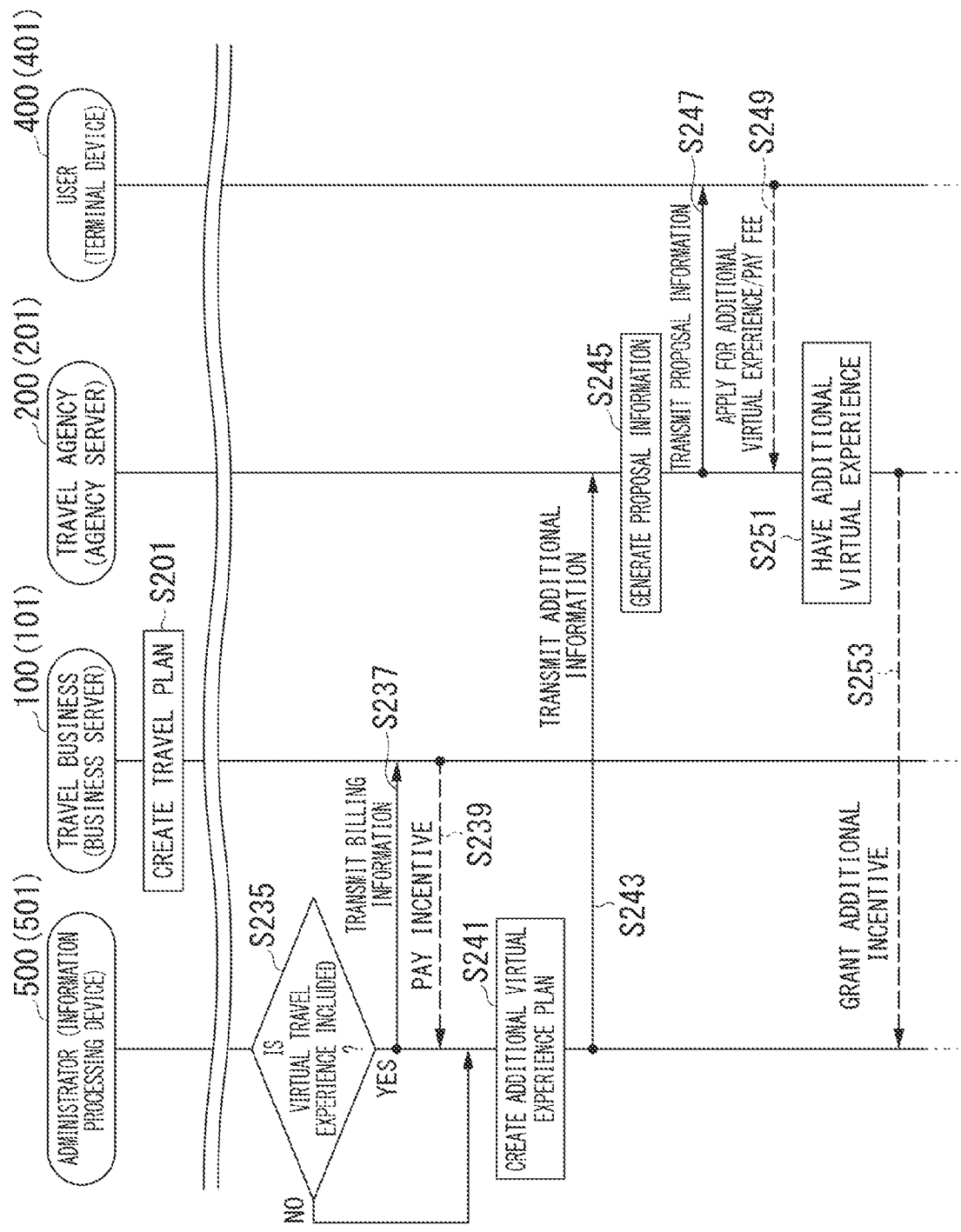
FIG. 14 is a diagram showing a part of an example of a flow of information or the like between respective constituents of an information processing system.

Next, an example of the flow of information and the like between respective constituents of the information processing system 1 in the second embodiment will be described. FIG. 14 is a diagram showing a part of an example of a flow of information and the like between respective constituents of the information processing system 1. In the information processing system 1, after the information processing device 500 determines in step S235 that there is a virtual travel experience at the destination in the travel product, or after the process in step S239 is completed, the second acquirer 550 of the information processing device 500 creates an additional virtual experience plan on the basis of the experience information transmitted by the terminal device 400 (step S241).

The information processing device 500 generates additional information based on the created additional virtual experience plan and transmits the additional information to the agency server 200 (step S243). The agency server 200 generates proposal information on the basis of the additional information (step S245) and transmits the generated proposal information to the terminal device 400 (step S247).

Subsequently, in a case where the user 401 of which the proposal information is transmitted to the terminal device 400 by the agency server 200 desires the additional virtual experience, the user 401 applies for the additional virtual experience together with payment of an additional virtual experience facility usage fee (step S249). The travel agency 201 that has received the application for the additional virtual experience causes the user 401 to have the additional virtual experience (step S251). Thereafter, the travel agency 201 grants an additional incentive to the administrator 501 by paying an amount of money according to the additional billing information included in the additional information (step S253). As described above, a series of processes is finished.

Figure 15:
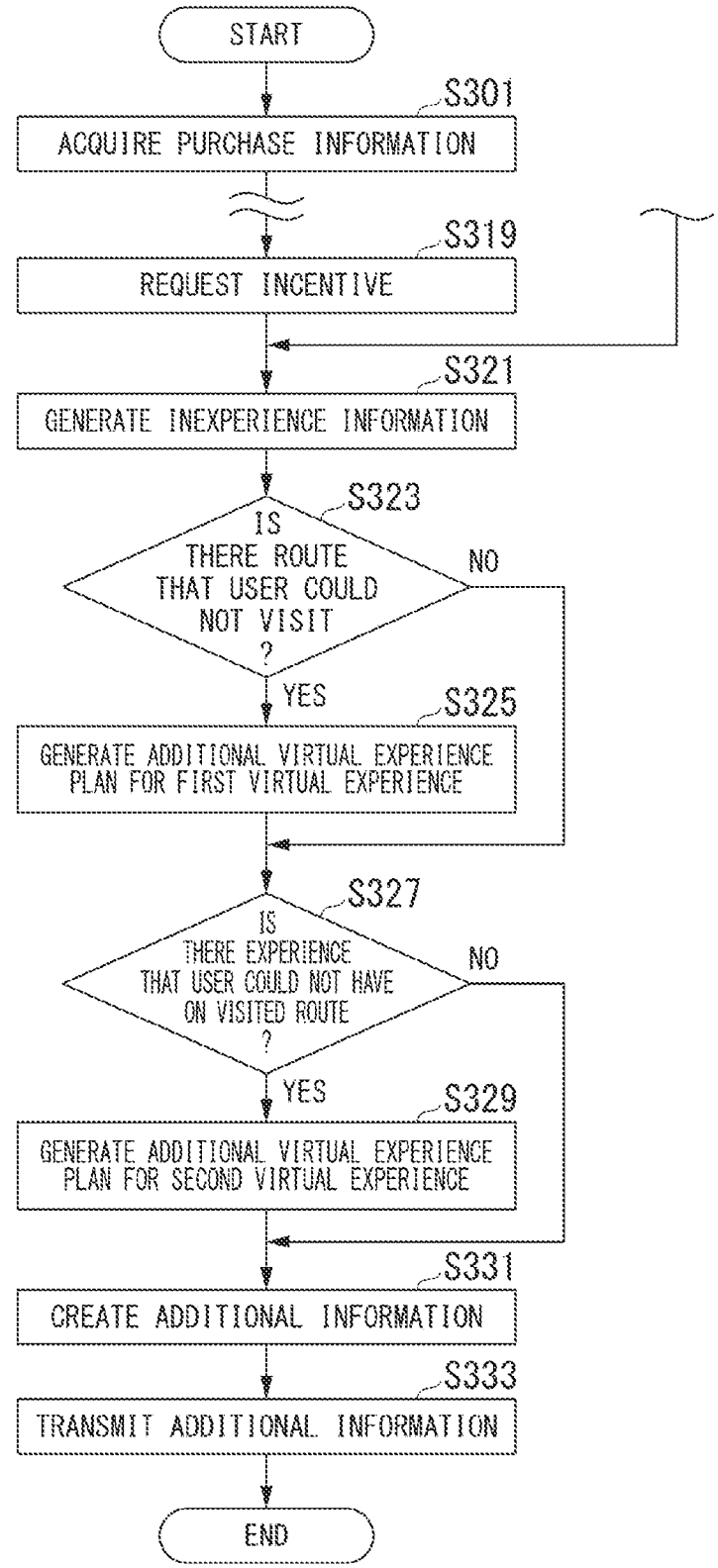
FIG. 15 is a flowchart showing a part of an example of a process of the information processing device.

Subsequently, a process in the information processing device 500 will be described. FIG. 15 is a flowchart showing a part of an example of a process in the information processing device 500. After the process in step S319 is finished or after the generator 530 determines in step S305 (FIG. 9) that the user 401 has not experienced the virtual travel in the travel product, the first acquirer 520 of the information processing device 500 generates inexperience information (step S321).

Subsequently, the second acquirer 550 determines whether or not there is a route that the user 401 could not visit in the target travel (step S323). In a case where it is determined that there is a route that the user 401 could not visit, the second acquirer 550 creates an additional virtual experience plan for causing to the user to have the first virtual experience (step S325). In a case where the user 401 determines that there is no route that the user 401 could not visit, the second acquirer 550 skips the process in step S325 and proceeds to the process in step S327.

Subsequently, the second acquirer 550 determines whether or not there is an experience that the user 401 could not have on the visited route (step S327). In a case where it is determined that there is an experience that the user 401 could not have, the second acquirer creates an additional virtual experience plan for causing the user to have the second virtual experience (step S329). In a case where it is determined that there is no experience that the user 401 could not have, the information processing device 500 finishes the process shown in FIG. 15 without further processes.

Subsequently, the second acquirer 550 generates additional information on the basis of the additional virtual experience plan generated in steps S325 and S329 (step S331). The generator 530 outputs the additional information generated by the second acquirer 550 to the agency server 200 (step S333). As described above, the information processing device 500 finishes the process shown in FIG. 15.

The information processing device 500 of the second embodiment achieves the same advantageous effects as those of the information processing device 500 of the first embodiment. In the second embodiment, the user 401 can have an experience that the user could not have in a target travel through an additional virtual experience at the virtual experience facility 210. Therefore, it is possible to supplement an experience that was not possible in a target travel with a virtual experience and thus to increase a satisfaction level of a travel for the user 401.

Since opportunities for using the virtual experience facility 210 can be increased, it is possible to contribute to an increase in the profit of the administrator 501 and to give the travel agency 201 an additional profit.

The above-described embodiments may be expressed as follows.

Appendix 1

An information processing device includes a first acquirer configured to acquire virtual experience information indicating that a user has been provided with a virtual travel service to experience a virtual travel, and purchase information indicating that the user has purchased a right to receive a real travel service to experience a real travel;

a generator configured to, in a case where the first acquirer acquires the virtual experience information and the purchase information, generate grant information for granting an incentive for the user to purchase the right to a provider of the virtual travel service or a provider providing an apparatus used for the virtual travel service; and an outputter configured to output the grant information.

Appendix 2

The generator may adjust the incentive according to a value of the real travel service.

Appendix 3

The value may include at least one of a hot-seller, a popularity, or a recommendation.

Appendix 4

The generator may adjust the incentive according to the type of the real travel service.

Appendix 5

The type of the real travel service may include at least one of a domestic travel, an overseas travel, the presence or absence of an optional tour, whether or not there is an accompanying tour conductor, or a travel itinerary.

Appendix 6

The generator may reduce the incentive in a case where the real travel service is a service in which the provider is involved compared with a case where the real travel service is a service in which the provider is not involved.

Appendix 7

The provider may provide a predetermined service different from the virtual travel service at a destination of the real travel, and the generator may reduce the incentive in a case where the user has received the service at the destination of the real travel compared with a case where the user has not received the service.

Appendix 8

The first acquirer may further acquire inexperience information of a travel experience that the user could not have at the destination of the real travel, the information processing device may further include a second acquirer configured to acquire information regarding an experience of an unexperienced virtual travel based on the inexperience information, and in a case where the user has had the experience of the unexperienced virtual travel, the generator may generate information for granting an additional incentive for the experience of the unexperienced virtual travel to the provider of the virtual travel service or the provider providing the apparatus used for the virtual travel service.

Appendix 9

The travel experience that the user could not have may include at least one of an experience that the user visits a route that the user could not visit at the destination of the real travel or an experience that the user could not have on a route visited at the destination of the real travel.

Appendix 10

An information processing method is a method of causing a computer to:

acquire virtual experience information indicating that a user has been provided with a virtual travel service to experience a virtual travel, and purchase information indicating that the user has purchased a right to receive a real travel service to experience a real travel;

in a case where the virtual experience information and the purchase information are acquired, generate grant information for granting an incentive for the user to purchase the right to a provider of the virtual travel service or a provider providing an apparatus used for the virtual travel service; and output the grant information.

Appendix 11

A non-transitory storage medium stores computer-readable instructions for causing a computer to execute:

acquiring virtual experience information indicating that a user has been provided with a virtual travel service to experience a virtual travel, and purchase information indicating that the user has purchased a right to receive a real travel service to experience a real travel;

in a case where the virtual experience information and the purchase information are acquired, generating grant information for granting an incentive for the user to purchase the right to a provider of the virtual travel service or a provider providing an apparatus used for the virtual travel service; and outputting the grant information.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. An information processing system comprising:
an information processing device, comprising:
a storage medium that stores computer-readable instructions;
a processor connected to the storage medium; and
a moving object configured to be installed in a virtual experience facility and to carry a user and move within the virtual experience facility, wherein the virtual experience facility is a facility that provides a virtual travel service to the user wearing a wearable device,
wherein the processor executes the computer-readable instructions to
acquire virtual experience information indicating that the virtual travel service was provided to the user who moved within the virtual experience facility on the moving object, and purchase information indicating that a real travel service to experience a real travel was purchased by the user who has been provided with the virtual travel service,
in response to acquisition of the virtual experience information and the purchase information, generate grant information indicating a granting of an incentive for the user to purchase a right to a provider of the virtual travel service or a provider providing the moving object or the wearable device used for the virtual travel service,
output the grant information, and
reduce the incentive in a case in which the real travel service benefits the provider relative to a case in which the real travel service does not benefit the provider.

2. The information processing system according to claim 1, wherein the processor adjusts the incentive according to a value of the real travel service.

3. The information processing system according to claim 2, wherein the value includes at least one of a popularity or a recommendation.

4. The information processing system according to claim 1, wherein the processor adjusts the incentive according to the type of the real travel service.

5. The information processing system according to claim 4, wherein the type of the real travel service includes at least one of a domestic travel, an overseas travel, the presence or absence of an optional tour, inclusion of an accompanying tour conductor, or a travel itinerary.

6. The information processing system according to claim 1, wherein
the provider provides a predetermined service different from the virtual travel service as a part of the real travel, and
the processor reduces the incentive in a case in which the user has received the predetermined service relative to a case in which the user has not received the service.

7. The information processing system according to claim 1, wherein, in a case in which the user has virtually had a travel experience that the user could not have as a part of the virtual travel in the virtual travel service, the processor generates the grant information to indicate that an additional incentive for the travel experience that the user has virtually had is granted to the provider.

8. The information processing system according to claim 7, wherein the travel experience comprises at least one of virtually touring one or more determined tour routes in the real travel or virtually experiencing one or more activities that the user could not experience on the routes.

* * * * *